United States Patent [19]

Ducasse

[11] 4,338,201

[45] Jul. 6, 1982

[54] CONTINUOUS SEPARATION SYSTEM

[75] Inventor: Joseph C. V. Ducasse, Martinez, Calif.

[73] Assignee: Fabcon, San Francisco, Calif.

[21] Appl. No.: 213,290

[22] Filed: Dec. 5, 1980

Related U.S. Application Data

[60] Division of Ser. No. 66,712, Aug. 15, 1979, Pat. No. 4,256,582, which is a continuation-in-part of Ser. No. 906,078, May 15, 1978, abandoned.

[51] Int. Cl.[3] ........................ B01D 33/24; B01D 37/00

[52] U.S. Cl. .................................. 210/771; 210/772; 210/780

[58] Field of Search ................................ 210/770-772, 210/780, 784

[56] References Cited

U.S. PATENT DOCUMENTS

| | | | |
|---|---|---|---|
| 631,603 | 8/1899 | Zahn | 210/771 X |
| 2,086,180 | 7/1937 | Bonotto | 210/771 X |
| 2,198,412 | 4/1940 | McDonald | 210/771 |
| 3,319,789 | 5/1967 | Brown et al. | 210/771 |
| 3,338,411 | 8/1967 | von der Gathen et al. | 210/771 X |
| 3,361,259 | 1/1968 | von der Gathen et al. | 210/771 |
| 3,744,543 | 7/1973 | Emmett, Jr. et al. | 210/771 X |
| 4,115,265 | 9/1978 | Otte et al. | 210/771 X |

FOREIGN PATENT DOCUMENTS

| | | | |
|---|---|---|---|
| 1309138 | 12/1962 | France | 210/771 |

*Primary Examiner*—Robert H. Spitzer
*Attorney, Agent, or Firm*—Townsend and Townsend

[57] ABSTRACT

A method of separating solids and liquid material in a slurry. The solids are continuously purged, washed, dried and removed with a minimum amount of mechanical handling. The slurry is continuously deposited on a moving horizontal rotary screen and condensible vapor is introduced above the layer while the pressure is reduced below the layer. Liquid is withdrawn from underneath the slurry layer with the vapor passing through the layer becoming superheated upon passage to evaporate further liquid from the solids. A stream of gas, which may be the same condensible vapor, is directed at the solids to entrain them and remove them from the screen.

11 Claims, 4 Drawing Figures

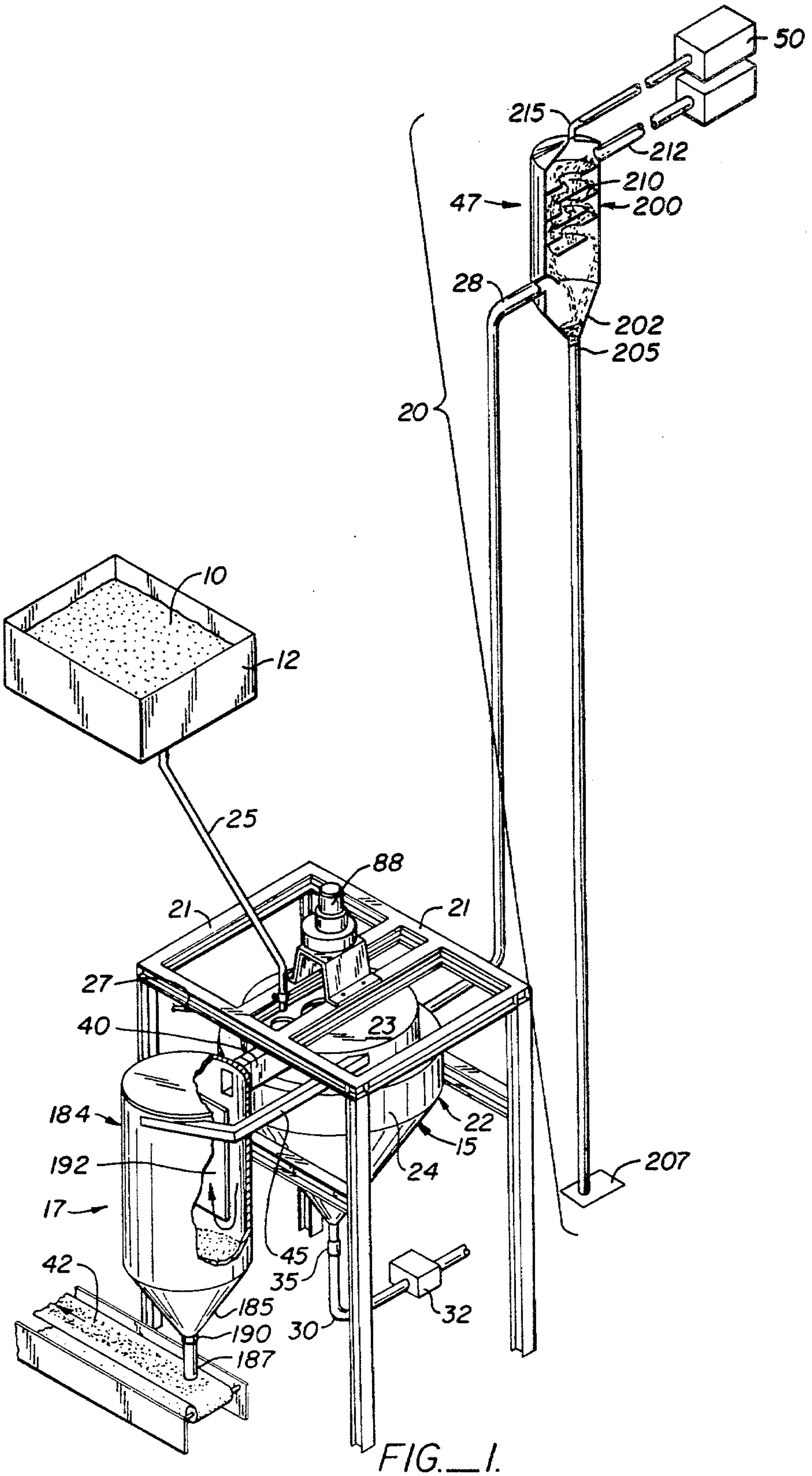
FIG._1.

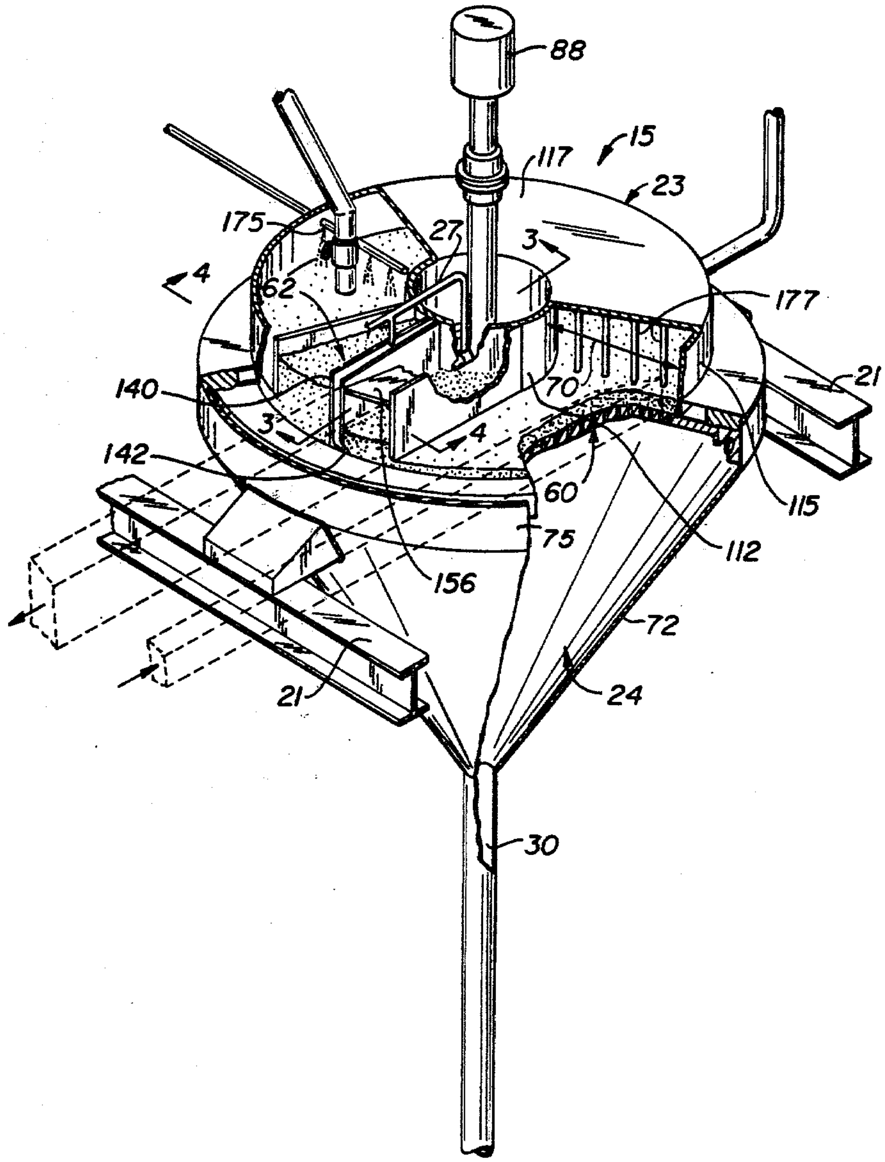
FIG._2.

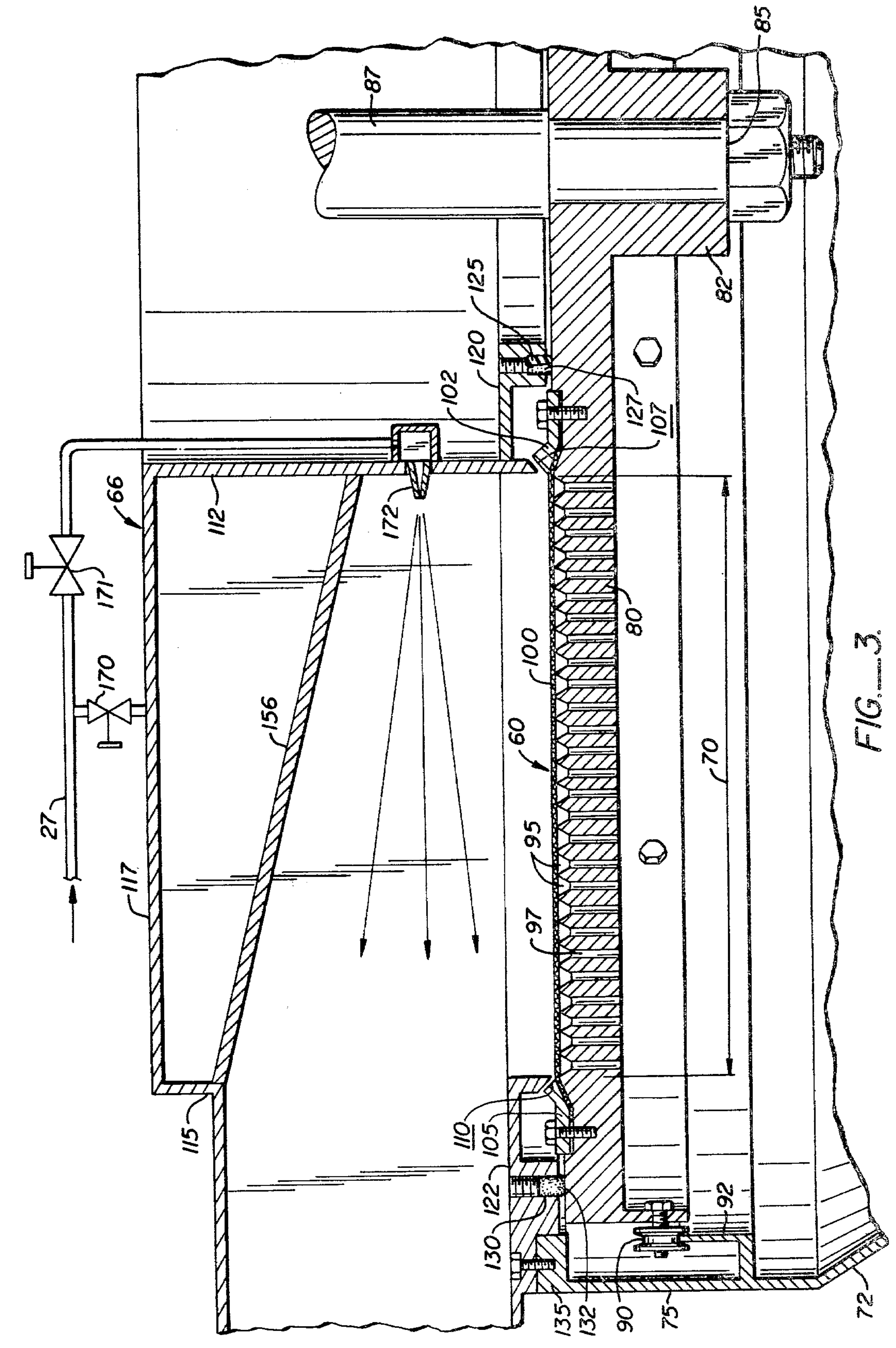
FIG._3.

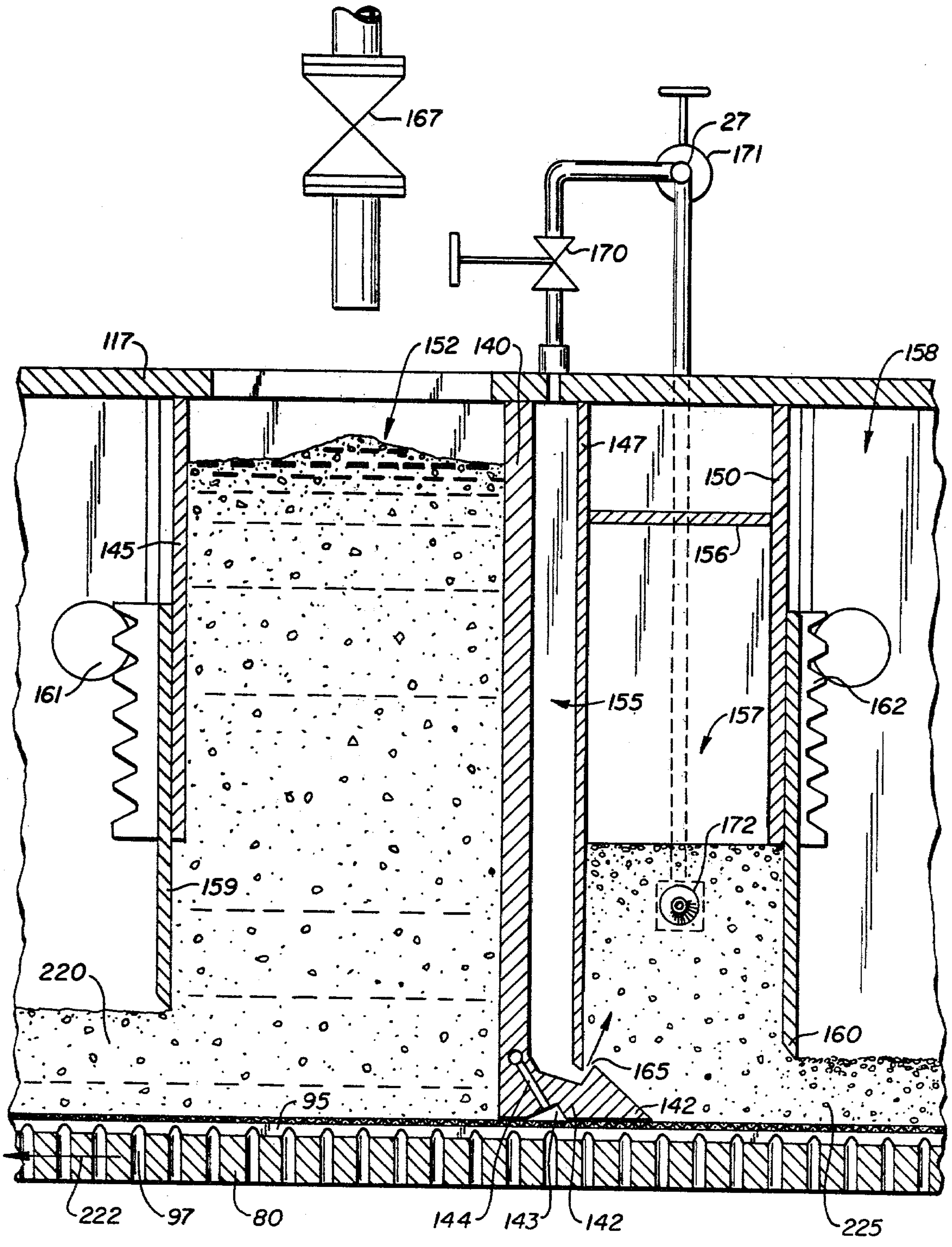
FIG._4.

CONTINUOUS SEPARATION SYSTEM

This is a division of application Ser. No. 66,712, filed Aug. 15, 1979, now U.S. Pat. No. 4,256,582, which is itself a continuation in part of Ser. No. 906,078 filed May 15, 1978, now abandoned.

FIELD OF THE INVENTION

This invention relates generally to separation of solids and liquids in slurries, and more specifically to separation of sugar crystals from molasses in massecuite.

BACKGROUND OF THE INVENTION

Most separation of commercial sugar crystals from molasses occurs in centrifugal separators. However, this technique has many disadvantages in that, in order to develop the required centrifugal force, the baskets on which the screens are mounted must be rotated at relatively high speeds (usually from about 1,000 to 1,800 rpm). Operation thus requires considerable power, typically in the neighborhood of 50 to 100 horsepower, further necessitating careful dynamic balance of the rotating parts and sturdy construction of the entire system. A further difficulty with centrifugal separators is that they operate in a batch mode and thus have to be stopped for admitting the massecuite and then again for discharging the sugar crystals, thereby resulting in a loss of time. There have been attempts to design continuous mode centrifugal separators, but they have not been commercially successful due to defective separation, often accompanied by sugar crystal breakage.

Crystals from the centrifugal separator are typically characterized by a moisture content in the range 0.5–0.7%, while the end product is required to have a moisture content less than about 0.2%. Thus the crystals are sent to dryers. These dryers are rather large drum devices in which the sugar crystals to be dried are introduced and cascaded within the drum as a stream of hot air is directed through the drum to evaporate the moisture. Unfortunately, the cascading action causes considerable crystal breakage and actually causes a fraction of the sugar crystals to be transformed into a powdered form. This presents serious dangers of explosion and thus necessitates costly precautionary procedures.

Continuous separation systems are known. In particular, U.S. Pat. No. 701,687 to Desaulles discloses a rotary screen device wherein a fixed inlet chute deposits massecuite on a rotating screen while a screw auger removes sugar crystals from the screen after substantially an entire rotation. Removal of the molasses is effected by a vacuum tank rotating along with the screen that serves to draw the liquid through the screen. While this system is capable of operating in a continuous mode, it nevertheless subjects the sugar crystals to excessive mechanical handling with the result of crystal breakage. Additionally, it should be noted that the crystals still require further handling such as purging, drying, etc., and the attendant costs and dangers associated therewith.

An alternate approach to the continuous recovery of commercial sugar crystals and molasses has been tried, and employs a filtering belt and a casing under vacuum. During operation, the massecuite is fed continuously on top of the belt and the molasses recovered into the casing by the suction action of the vacuum. The remaining sugar crystals are eventually scraped off and removed from the belt and sent to a dryer. The molasses is transferred from the casing to a degassifying chamber before being pumped from the system. Apparently, problems have been encountered in maintaining the required vacuum within the casing due to cracks in the sugar layer arising from the inability to keep a belt truly flat and level.

Accordingly, there is presented a need for a continuous separation system of simple design and operation which avoids the problem of crystal breakage.

SUMMARY OF THE INVENTION

The present invention provides an improved method of separating solids and liquid in a slurry in a manner which continuously purges, washes, dries, and removes solids with a minimum amount of mechanical handling and consequential crystal breakage.

A separator within the continuous separation system of the present invention comprises a stationary casing, a horizontal rotary screen within the casing, a fixed scraper mounted in the casing above the screen, an inlet conduit on one side of the scraper for depositing slurry on the screen to form a layer as the screen rotates, an outlet conduit on the other side of the scraper for carrying away dried solids, and gas nozzles for directing a gas stream at the solids as they encounter the scraper, entraining them, and directing them through the outlet conduit. The screen divides the casing interior into respective upper and lower chambers that are sealed from one another except through the screen.

In operation, the gas stream carries the entrained solids to a separate receiver where the solids are gravitationally separated from the gas stream and carried off by a suitable conveyor. The gas is then recirculated and enters the upper chamber of the separator at a slightly positive pressure. The lower chamber is evacuated so that a portion of the gas in the upper chamber passes through the slurry layer to displace liquid through the screen while further amounts of the gas cause additional drying of the solids so that they are of a suitably low liquid content when they encounter the fixed scraper and are entrained out of the separator. The recovered liquid is automatically degassified as it falls through the lower chamber prior to its removal.

It can immediately be appreciated that the use of a rigid screen assembly rotating at low speeds, and employing vacuum rather than centrifugal force to effect liquid separation require less power, sophisticated equipment, and labor. Throughput is easily adjusted by either varying the amount of material deposited on the screen, varying the speed of rotation of the screen, or both. The use of gas to entrain the dried solids minimizes mechanical handling and consequential breakage, while using the gas to dry the solids minimizes the additional mechanical handling the solids have to undergo.

According to a further aspect of the present invention that is especially useful when the slurry is an aqueous slurry such as massecuite, the gas that is first used to entrain the dried solids and then recirculated to dry the slurry layer on the screen comprises dry steam under pressure. The steam becomes superheated as it expands upon entering the upper chamber. The use of steam provides numerous surprising advantages. In particular, since the slurry is typically cooler than the steam, the steam that contacts the slurry layer at a position where it has recently been deposited momentarily condenses and thus dilutes the liquid and facilitates the separation or purging process. However, as the water passes through the slurry layer, and encounters a region of lower pressure, the condensed water reevaporates so that it does not add materially to the amount of wash water in the recovered liquid. At the same time, the steam that passes through the already heated portions of the slurry layer does not condense, but rather becomes superheated as it passes through the layer, thereby rendering the drying effect more efficient. Thus, the steam is first used for transporting the solids, and is then recirculated for purging, washing, and drying the slurry layer prior to removal of the solids by newly introduced steam.

The use of steam is also advantageous since a high vacuum in the lower chamber of the separator may be provided with a relatively small air pump. In particular, the system for evacuating the lower chamber includes a condenser for condensing the steam after it passes out of the lower chamber. The improved vacuum facilitates and makes more efficient the separation process.

For a more complete understanding of the nature and features of the present invention, reference should be had to the remaining portions of the specification taken with the attached drawings.

BRIEF DESCRIPTION OF THE DRAWINGS

FIG. 1 is a simplified partially cut-away isometric schematic of the separation system according to the present invention;

FIG. 2 is a simplified cut-away isometric view of the separator;

FIG. 3 is a cross-sectional view of the separator taken along line 3—3 of FIG. 2; and FIG. 4 is a cross-sectional view of the separator taken along line 4—4 of FIG. 2.

DESCRIPTION OF THE PREFERRED EMBODIMENT

FIG. 1 is a simplified isometric schematic of a continuous separation system for separating solids and liquids contained in a body of slurry 10 within a slurry vat 12. The separation system includes a separator 15, a receiver 17, and an evacuation system 20. Separator 15 is supported by a frame 21 and comprises a casing 22 having respective upper and lower chambers 23 and 24. In operation, slurry in vat 12 is admitted to upper chamber 23 of separator 15 through a slurry supply pipe 25 while a source of gas is admitted to upper chamber 23 through a gas supply pipe 27. Evacuation system 20 communicates with lower chamber 24 via a vacuum pipe 28. The operation of separator 15, as will be described below, culminates in a separation of the solids and liquid within slurry 10. The liquid is drawn off from lower chamber 24 through a suction pipe 30 by a suitable pump 32. A valve 35 in suction pipe 30 and a level sensor (not shown) cooperate to ensure that pump 32 is primed at all times.

The separation and drying of the solids occur by means of the gas supplied through gas inlet 27. As will be described in greater detail below, the gas is first used to entrain the dried solids and carry them out of upper chamber 23 of separator 15 through a solids outlet conduit 40 to receiver 17. The solids are discharged at the bottom of receiver 17 onto a suitable conveyor 42 and transported elsewhere. The gas that carried the solids into receiver 17 is communicated back into upper chamber 23 through a recirculation conduit 45 for separating and drying subsequent amounts of slurry introduced into separator 15.

Separation is effected by a cooperation of the pressurized gas introduced into upper chamber 23 through recirculation conduit 45 and the vacuum maintained in lower chamber 24 through vacuum conduit 28. According to a particular aspect of the present invention, the gas introduced through gas supply line 27 comprises a condensible vapor such as steam, and evacuation system 20 comprises a barometric condensor 47 and a vacuum pump 50. The operation of evacuation system 20 will be described in detail below.

FIG. 2 is a simplified cut-away isometric view of separator 15. A horizontal rotary screen assembly 60 is mounted for rotation within casing 22 and separates the interior of casing 22 into upper chamber 23 and lower chamber 24. A stationary scraper assembly 62 is mounted above screen assembly 60. Screen assembly 60 has an annular liquid pervious portion extending over a radial range 70, and upper chamber 23 is of generally annular configuration covering the entire radial extent of range 70. Lower chamber 24 is defined by a downwardly tapering lower conical shell 72 connected to an upper cylindrical shell 75. Vacuum pipe 28 communicates with lower chamber 24 through a port in cylindrical shell 75.

FIG. 3 is a cross-sectional view taken through line 3—3 of FIG. 2, showing in greater detail the construction of screen assembly 60 and the means for effecting a seal between upper chamber 23 and lower chamber 24 so that fluid communication therebetween only occurs through screen assembly 60. Screen assembly 60 includes a circular disc 80 having a central hub 82 through which is concentrically attached the bottom end 85 of a vertical shaft 87. Shaft 87 is journaled to frame 21 by appropriate bearings, and is driven by a motor 88 which is also attached to frame 21. Disc 80 is preferably supported at its outer ends by a plurality of wheels 90 that ride on cooperating rails 92 affixed to the inner surface of cylindrical shell 75.

Disc 80 has on its upper surface a plurality of concentric grooves 95, the grooves extending over radial range 70. At the bottom of each groove 95 is a plurality of circumferentially spaced apertures 97 that extend from the bottom of the groove to the lower surface of disc 80. Radial range 70 is such that the innermost and outermost grooves are spaced from the center and the circumference, respectively, of disc 80. An annular screen 100 overlies disc 80 and extends over the entire liquid pervious portion thereof, and extends radially inwardly and outwardly therefrom by a small distance. Screen 100 is securely held flat by an inner circular retaining flange 102 and an outer circular retaining flange 105, retaining flanges 102 and 105 having respective upper inclined surfaces 107 and 110 that slope upwardly away from the surface of screen 100 in radially inward and outward directions, respectively.

Annular upper chamber 23 is defined by vertical inner and outer cylindrical shells 112 and 115, and a horizontal annular plate 117. The lower ends of cylindrical shells 112 and 115 are inclined to match with small clearance sloping surfaces 107 and 110 of retaining flanges 102 and 105 holding screen 100 to disc 80. Cylindrical shell 112 carries an inwardly extending horizontal sealing flange 120; outer cylindrical shell 115 carries an outwardly extending horizontal sealing flange 122. Inner sealing flange 120 is provided with a downwardly facing circumferential groove 125 in which a vertically adjustable rubber seal bearing 127 is disposed. Seal 127 bears against disc 80 at a point radially inward of inner retaining flange 102. Similarly, outer sealing flange 122 has a circumferential groove 130 in which is located a vertically adjustable rubber seal 132 that bears against disc 80 at a point radially outward of outer retaining flange 105. Lower chamber cylindrical shell 75 has an inwardly extending flange 135 that is fastened to outer sealing flange 122 in a gas-tight manner. Thus, upper chamber 23 is sealed from lower chamber 24 and communicates therewith only through apertures 97 in disc 80 and screen 100.

The mechanism for introducing slurry into upper chamber 23 and removing dried solids is best seen with reference to FIGS. 2 and 4. FIG. 4 is a cross-sectional view taken along line 4—4 of FIG. 2. Scraper assembly 62 comprises a partition plate 140 extending the entire radial and vertical dimensions of annular upper chamber 23, and a shoe-like scraper 142 along its bottom edge and contacting screen 100. Scraper 142 preferably has its bottom surface provided with a radially extending recess 143, at the top of which are disposed a number of holes 144 communicating to a source of water (not shown) for continuously cleaning screen 100 during operation. Additional vertical partition walls 145, 147, and 150 further subdivide upper chamber 23 into additional smaller chambers. In particular, vertical partition plate 145 is angularly spaced in a first direction from scraper partition plate 140 to define therewith a slurry inlet chamber 152. Partition plate 147 is spaced in a second opposite direction from scraper partition plate 140 to define a plenum chamber 155; partition plate 150 is further spaced in the second direction from partition plate 147 to define a solids outlet chamber 157. A slanted plate 156 provides a gradual transition between chamber 157 and solids outlet conduit 40. The remaining, major portion of upper chamber 22, designated by reference numeral 158, is the drying chamber. Partition plates 145 and 150 extend downwardly from plate 117 by a distance less than the entire vertical dimension of upper chamber 23. Partition plates 145 and 150 carry respective vertically movable extensions 159 and 160. The distance of these movable extensions from screen 100 is made adjustable from outside upper chamber 23 by suitable rack and pinion mechanisms 161 and 162. Partition plate 147 extends downwardly to within a small distance of scraper 142 to define a horizontally extending narrow slot 165 communicating from plenum chamber 155 to solids outlet chamber 157.

Slurry inlet conduit 25 communicates through a valve 167 to the top of slurry inlet chamber 152. Gas line 27 communicates to plenum chamber 155 through a valve 170, and further communicates downwardly into solids outlet chamber 157 through a valve 171, terminating in a horizontal, radially outwardly directed nozzle 172.

An array of spray nozzles 175 is disposed within drying chamber 158 at a position generally proximate partition plate 145. Array of nozzles 175 is typically provided by a plurality of radially extending manifold tubes connected to an outside water source (not shown). These nozzles are sometimes needed to wash the crystals.

Within the remaining portion of drying chamber 158 is an array of stirrers in the form of downwardly extending vertical spikes 177 extending to within a short distance from the top of screen 100. These stirrers enhance the drying process and prevent caking of the slurry layer.

Referring again to FIG. 1, receiver 17 is in the form of a vessel 184 having a conical bottom section 185 terminated by a solids discharge pipe 187 fitted with a valve 190. Solids outlet conduit 40 is horizontal and communicates with the chamber of receiver at an upper portion thereof. A central partition plate 192 extends downwardly below the point at which solids outlet conduit 40 enters receiver vessel 184. Plate 192 preferably has a resilient surface facing solids outlet conduit 40 to minimize impact forces.

Barometric condenser 47 is in the form of a vessel 200 having a downwardly tapered bottom portion 202 which communicates to a vertical barometric pipe 205 having its bottom end immersed in a pond of water 207. Within condenser vessel 200 are located staggered horizontal baffles 210 above which is located a water supply pipe 212. Vacuum pump 50 communicates with vessel 200 at its uppermost portion, via a pipe 215. Vacuum pipe 28 communicates with vessel 200 at a position below baffles 210 and above barometric pipe 205.

Having described the structure of the present invention, the operation may now be understood. For definiteness, it is helpful to suppose that it is required to separate commercial sugar crystals from massecuite, a highly viscous mixture of molasses and sugar crystals obtained from boiling cane juice. In particular, the procedure occurs as follows:

With valves 190 and 35 closed, lower chamber 24 is put under vacuum through vacuum pipe 28, barometric condenser 47, and pipe 215. A water column of a height corresponding to the vacuum (preferably around 28 inches mercury) within condenser 47 is established in barometric pipe 205. Water is then introduced into vessel 200 through water intake 212, and cascades down baffles 210, into pond 207 via barometric pipe 205. An overflow canal is preferably provided for pond 207.

Dry steam under pressure and at a convenient temperature (e.g. 220° F.) is admitted into upper chamber 23 through horizontally extending slot 165 and nozzle 172. The steam rushes into condenser 47 where it is condensed into water which flows down through barometric pipe 205, along with the incoming cooling water. Any incondensable gases such as air, etc. entrained with the steam or the condenser cooling water are withdrawn by vacuum pump 50.

Massecuite 10 is then allowed to flow from vat 12 at the correct temperature (approximately 158° F.) into slurry inlet chamber 152 and separator upper chamber 23, depositing itself on screen 100. As soon as the massecuite within slurry inlet chamber 152 reaches a level approximately the entire height of upper chamber 23 motor 88 is started so that the screen rotates in a direction such that the massecuite immediately on the screen begins moving away from scraper partition plate 140 and into drying chamber 158. Movable extension 159 is adjusted so that its bottom is at a desired height (for example 4") above screen 100 so that a massecuite layer 220 is formed and beings moving slowly in the direction of arrow 222 as screen assembly 60 rotates. In the meantime since lower chamber 24 is under vacuum, separation commences with liquid molasses being sucked through the pervious portion of screen assembly 60 while a layer 225 of sugar crystals remains on top of screen 100. As the sugar crystals continue their travel within drying chamber 158, they are dried by the steam, as will be described below, ultimately encountering scraper 142. They are then scraped off screen 100, being blown into receiver 115 by the combined actions of the steam jets from slot 165 and nozzle 172. The steam flowing out of slot 165 blows the sugar crystals generally upwardly, partially fluidizing them, so that nozzle 172 may blow them out through solids outlet conduit 40.

The level of massecuite layer 220 is higher than the level of sugar crystal layer 225 due to the removal of molasses during the separation process. Movable extension 160 is adjusted to provide a small clearance above the top of layer 225 of sugar crystals in order to prevent the incoming steam within solids outlet chamber 157 from expanding into drying chamber 158. Thus the steam expands through conduit 40 to facilitate the expulsion of the sugar crystals.

Once the sugar crystals have been entrained in the flow of steam, and enter receiver 17, the steam and entrained sugar crystals encounters vertical partition plate 912 and are deviated downwardly toward the bottom of receiver 17. The sugar crystals, assisted by gravity, are deposited while the steam continues upwardly around the bottom of partition plate 192 and then through recirculation conduit 45 into drying chamber 158.

This process continues until the sugar crystals in receiver 17 reach a convenient height, at which time valve 190 is opened and conveyer 42 is started. The sugar crystals drop through solids discharge pipe 187 onto the conveyer to direct them to a sugar storage area or the like. The sugar crystals must be kept at a convenient height within receiver 17 in order to seal the interior of chamber 184 from the atmosphere.

Upon reaching drying chamber 158, the expanded steam, whose initial pressure, temperature, and volume is such to maintain a slight positive pressure within drying chamber 158, is slighly superheated and occupies the entire volume within chamber 158 on top of the material being processed.

Thus, the steam above the layer of material (slurry when it enters and crystals when it leaves) is at a slightly positive pressure while the region underneath screen assembly 60 is under vacuum. Accordingly, the steam is forced through the material being processed, entraining with it the molasses contained in the massecuite during the early stages of the process (that is for the material proximate slurry inlet chamber 152), and entraining the moisture contained in the layer of sugar solids during the later stages of the process (as they approach solids outlet chamber 157).

During the early stages, the material is at a much lower temperature than that of the steam (approximately 158° F. as opposed to 220° F.), thus causing part of the steam to momentarily condense on top of the slurry. In addition to diluting the molasses the condensation of the steam heats the molasses, thus lowering its viscosity to further facilitate the separation or purging process which usually takes place in 5 to 10 seconds, depending on the thickness of the slurry involved. However, due to the high pressure difference existing between upper chamber 23 and lower chamber 24, the condensed water starts reevaporating as it approaches screen 100 so that it subsequently leaves lower chamber 24 in a vapor state. This further offers the advantage of minimizing the amount of wash water in the recovered molasses. The purpose of spray nozzles 175 is to provide for further washing if it turns out that the effect of the temporarily condensed steam is not sufficient for proper purging.

During the later stages of the process, the sugar crystals have been brought up to a temperature almost equal to that of the steam, so that condensation does not occur. Therefore, the steam has the effect of drying the sugar crystals, this drying effect being more efficient as the steam progressively expands and becomes superheated on its way through the sugar crystals. Stirrers 177 serve the purpose of plowing the layer of sugar crystals in order to further improve the efficiency of the drying process. In order to minimize heat losses, receiver 17 and upper chamber 23 are preferably insulated on the outside.

The liquid molasses that collects in lower chamber 24 is automatically degassified by the action of the vacuum before being withdrawn through suction pipe 30 to appropriate storage tanks. The liquid molasses typically boils under the vacuum, thereby causing a portion of the water in the molasses to vaporize and pass to condenser 47 in a vapor state.

It is possible to use two or more separation systems in conjunction with a single common condenser, in which case vacuum conduit 28 would communicate with a vacuum manifold, the vacuum manifold being in communication with condenser 47.

As a general matter, the higher the vacuum within lower chamber 24, the better the separation effect. The use of steam in connection with a condenser provides an excellent method of maintaining an extremely high vacuum while requiring a relatively small vacuum pump. The reason that this is so is that during operation, the steam never reaches vacuum pump 50, but rather is condensed in condenser 47 and removed through barometric pipe 205. Naturally, the present system may be used with hot air, but in that case a vacuum pump capable of sustaining the required vacuum without the benefit of the condensation phenomenon is required.

In summary, it can be seen that the present invention provides a continuous separation system which removes dried solids in a gas stream with a minimum amount of mechanical handling, and provides the solids at a sufficiently low moisture content that subsequent drying operations are not required. Additionally, the use of steam to continuously purge, wash, dry and remove solids allows the process to be carried out economically, simply, and effectively.

While the above provides a full and complete disclosure of the prefered embodiments of the invention, various modifications, alternate constructions, and equivalents may be employed without departing from the true spirit and scope of the invention. For example, while a recirculating system wherein the gas is used first for entraining the dried solids and subsequently for drying additional solids is advantageous, there may be some circumstances where separate gas sources might be desirable. In particular, it might be useful to entrain the solids with air and to dry them with steam. Therefore, the above description and illustrations should not be construed as limiting the scope of the invention which is defined by the appended claims.

I claim:

1. A method of separating solid and liquid material in a slurry layer on a screen comprising the steps of:

continuously depositing said slurry on a moving liquid pervious member to form a slurry layer thereon;

introducing a condensible vapor at a first surface of said layer;

reducing the pressure at a second surface of said layer with respect to the pressure at said first surface in order to cause liquid to flow through said liquid pervious member so that the liquid content of said slurry layer becomes progressively lower as said layer is carried on said moving liquid pervious member;

withdrawing liquid from said second surface of said layer, said vapor passing through said layer and becoming superheated upon such passage therethrough, said superheated vapor evaporating further liquid from said solids to dry them;

directing a stream of gas at said slurry layer at a point where it consists essentially of solids to entrain said solids and remove them from said liquid pervious member; and separating said entrained solids from said gas stream.

2. The invention of claim 1 wherein an initial amount of said vapor initially condenses on said layer to purge and wash said solids of said liquid.

3. The invention of claim 1 wherein said directing step comprises the step of directing a stream of the same condensible vapor as is introduced in said introducing step.

4. The invention of claim 3, and further comprising the step of directing said stream of condensible vapor after separation of said solids therefrom to said slurry layer on said liquid pervious member at the upper surface thereof to at least partially define the condensible vapor that is introduced in said introducing step.

5. A method of separating solid and liquid material in a slurry comprising the steps of:

continuously depositing said slurry on a moving liquid pervious member to form a slurry layer thereon;

maintaining a pressure differential across said slurry layer with the pressure above said slurry layer being in excess of the pressure beneath said slurry layer in order to cause liquid to flow through said liquid pervious member so that the liquid content of said slurry layer becomes progressively lower as said layer is carried on said moving liquid pervious member;

directing a stream of gas at said slurry layer at a point where it consists essentially of solids to entrain said solids and remove them from said liquid pervious member; and separating said entrained solids from said gas stream;

directing said gas stream after separation of said solids therefrom to said slurry layer on said liquid pervious member at the upper surface thereof to at least partially contribute to said pressure differential, and to purge said slurry of liquid and dry remaining solids that have already been purged of liquid.

6. The invention of claim 5 wherein said gas is a condensible vapor of a liquid that is miscible with the liquid in said slurry and wherein said gas stream introduced above said slurry layer is at a temperature above the temperature at which said slurry is deposited on said liquid pervious member, such that a portion of said vapor initially condenses on at least a portion of said layer to dilute and heat the liquid in said slurry and aid in said purging, and elevates the temperature of said solids, and a further portion of said vapor when passing through said layer becomes superheated on such passage to cause evaporation of liquid from said solids.

7. A method of separating solid and liquid material in a slurry layer on a screen comprising the steps of:

forming a slurry layer;

transporting said slurry layer from an inlet location to an outlet location;

maintaining a pressure differential across said slurry layer with the pressure above said slurry layer being in excess of the pressure beneath said slurry layer in order to cause liquid to flow through said slurry layer so that the liquid content of said slurry layer becomes progressively lower as said layer moves toward said outlet location;

directing a stream of gas at said slurry layer at a point proximate said outlet location to entrain said solids; and separating said entrained solids from said gas stream.

8. The invention of claim 7, and further comprising the step of directing said gas stream after separation of said solids therefrom to a region above said slurry layer to at least partially contribute to said pressure differential, and to purge said slurry of liquid and dry remaining solids that have already been purged of liquid.

9. The invention of claim 7 wherein said maintaining step includes the step of introducing above said slurry layer a condensible vapor of a liquid that is miscible with the liquid in said slurry and wherein said vapor introduced above said slurry layer is at a temperature above the temperature of said slurry layer near said inlet location, such that a portion of said vapor initially condenses on at least a portion of said layer to dilute and heat the liquid in said slurry and aid in said purging, and elevates the temperature of said solids, and a further portion of said vapor when passing through said layer becomes superheated to cause evaporation of liquid from said solids.

10. The invention of claim 1 or 6 or 7 wherein said step of introducing a condensible vapor comprises the step of introducing steam.

11. The invention of claim 1 or 6 or 7 wherein the step of reducing the pressure comprises the substeps of:

withdrawing said vapor and liquid evaporated by the passage of said vapor through said layer from said second surface; and condensing said vapor and evaporated liquid to create and maintain a vacuum at said second surface.

* * * * *